(12) United States Patent
Kawakami et al.

(10) Patent No.: US 11,091,399 B2
(45) Date of Patent: Aug. 17, 2021

(54) HONEYCOMB STRUCTURE

(71) Applicant: NGK Insulators, Ltd., Nagoya (JP)

(72) Inventors: Akifumi Kawakami, Nagoya (JP); Takashi Kinoshita, Nagoya (JP); Yuji Sasaki, Nagoya (JP); Mitsuhiro Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 307 days.

(21) Appl. No.: 16/385,439

(22) Filed: Apr. 16, 2019

(65) Prior Publication Data

US 2019/0352236 A1    Nov. 21, 2019

(30) Foreign Application Priority Data

May 16, 2018    (JP) .............................. JP2018-094601

(51) Int. Cl.
| | |
|---|---|
| C04B 38/00 | (2006.01) |
| B01D 46/24 | (2006.01) |
| B01D 53/94 | (2006.01) |
| B01J 35/04 | (2006.01) |
| F01N 3/28 | (2006.01) |

(52) U.S. Cl.
CPC ........ C04B 38/0009 (2013.01); B01D 46/247 (2013.01); B01D 46/2474 (2013.01); B01D 53/94 (2013.01); B01J 35/04 (2013.01); C04B 38/0016 (2013.01); F01N 3/281 (2013.01); F01N 3/2828 (2013.01);
(Continued)

(58) Field of Classification Search
None
See application file for complete search history.

(56) References Cited

U.S. PATENT DOCUMENTS

| | | |
|---|---|---|
| 2002/0042344 A1 | 4/2002 | Kondo et al. |
| 2014/0205794 A1 | 7/2014 | Tamai et al. |
| 2015/0275726 A1* | 10/2015 | Tamai .................. B01D 46/247 428/116 |

FOREIGN PATENT DOCUMENTS

| | | |
|---|---|---|
| DE | 10 2014 200 676 A1 | 7/2014 |
| GB | 2 342 055 A | 4/2000 |

(Continued)

OTHER PUBLICATIONS

German Office Action (Application No. 10 2019 207 031.0) dated Jan. 14, 2021 (with English translation).

*Primary Examiner* — David Sample
*Assistant Examiner* — Elizabeth Collister
(74) *Attorney, Agent, or Firm* — Burr & Brown, PLLC (57) ABSTRACT

A pillar-shaped honeycomb structure body of a honeycomb structure includes a circumferential cell structure, a central cell structure and a boundary wall therebetween. On a surface orthogonal to the cells there are a circumferential reinforcing region having the partition wall thicker than a basic partition wall thickness in the circumferential cell structure and existing outside a range of a distance from a centroid of the surface; and at least one of a first boundary reinforcing region having the partition wall thicker than the basic partition wall thickness and existing in a range of a distance from the centroid within a range of the circumferential cell structure and a second boundary reinforcing region having the partition wall thicker than a basic partition wall thickness in the central cell structure and existing outside of a range of a distance from the centroid within a range of the central cell structure.

10 Claims, 6 Drawing Sheets

(52) U.S. Cl.
CPC .............. *B01D 2046/2481* (2013.01); *B01D 2046/2496* (2013.01); *F01N 2330/30* (2013.01)

(56) References Cited

FOREIGN PATENT DOCUMENTS

| | | |
|---|---|---|
| JP | 2000-097019 A1 | 4/2000 |
| JP | 2002-177794 A1 | 6/2002 |
| JP | 2008-018370 A1 | 1/2008 |

* cited by examiner

HONEYCOMB STRUCTURE

The present application is an application based on JP 2018-094601 filed on May 16, 2018 with Japan Patent Office, the entire contents of which are incorporated herein by reference.

BACKGROUND OF THE INVENTION

Field of the Invention

The present invention relates to a honeycomb structure. More particularly, the present invention relates to a honeycomb structure excellent in mechanical strength in which two or more cell structures are separated by a boundary wall.

Description of the Related Art

There is conventionally used a honeycomb structure in which a catalyst is loaded to purify harmful substances such as HC, CO, and NOx contained in exhaust gas emitted from an engine of an automobile etc. Moreover, the honeycomb structure is also used as a filter for exhaust gas purification by plugging the open ends of cells defined by a porous partition wall.

The honeycomb structure is a pillar-shaped structure that has a partition wall defining a plurality of cells acting as through channels of exhaust gas. Such the honeycomb structure has a cell structure in which the plurality of cells is regularly arrayed at a predetermined cycle on a surface orthogonal to the direction of extension of the cells. Conventionally, one honeycomb structure has one kind of cell structure on the surface. However, with the aim of the improvement etc. of exhaust gas purification efficiency in recent years, there has been proposed a honeycomb structure that has two kinds or more of cell structures on the surface. For example, there has been proposed a honeycomb structure that has two kinds or more of cell structures on a surface orthogonal to the direction of extension of cells by causing central and circumferential portions on the surface to have different cell density and cell shape (e.g., see Patent Documents 1 to 3).

[Patent Document 1] JP-A-2002-177794
[Patent Document 2] JP-A-2008-018370
[Patent Document 3] JP-A-2000-097019

Patent Documents 1 to 3 disclose, as a honeycomb structure having two kinds or more of cell structures, for example, a honeycomb structure etc. that are configured to have high cell density in the central portion and low cell density in the circumferential portion on the surface orthogonal to the direction of extension of the cells. As described above, there has been conventionally proposed a honeycomb structure that has two or more cell structures in which the cell density differs between the central portion and the circumferential portion of the honeycomb structure.

For example, regarding the honeycomb structure having two or more different cell structures as described above, it is conceivable to arrange a porous boundary wall in a boundary portion between the cell structures. In such the honeycomb structure, each of regions separated by the boundary wall has a constant thickness of a partition wall defining corresponding cells.

A honeycomb structure is commonly manufactured by extruding the forming raw materials including ceramic raw materials etc. to form a honeycomb formed body and by firing the obtained honeycomb formed body. When forming a honeycomb formed body by extrusion as described above, the honeycomb structure having two kinds or more of cell structures may have cells whose shapes are deformed in the vicinity of the boundary wall separating the cell structures. For this reason, the honeycomb structure having two kinds or more of cell structures has a problem that the influence of the decrease in strength due to the deformation of the cell shape as described above is large and thus it is difficult to manufacture a honeycomb structure having stable mechanical strength.

The present invention has been achieved in view of the problems of the above conventional technology. An object of the invention is to provide a honeycomb structure excellent in mechanical strength in which two or more cell structures are separated by a boundary wall.

SUMMARY OF THE INVENTION

According to the present invention, there is provided a honeycomb structure to be described below.

[1] A honeycomb structure including: a pillar-shaped honeycomb structure body that includes a porous partition wall that defines a plurality of cells acting as fluid through channels extending from an inflow end face to an outflow end face and a circumferential wall that is disposed to surround an outer circumference of the partition wall, wherein the honeycomb structure body includes: on a surface orthogonal to a direction of extension of the cells, a circumferential cell structure that is formed on an outer circumference of the honeycomb structure body; a central cell structure that is formed in a central portion inside from the circumferential cell structure and has a cell structure different from the circumferential cell structure; and a boundary wall that is disposed in a boundary portion between the circumferential cell structure and the central cell structure, the honeycomb structure body includes: a circumferential reinforcing region in which a thickness T01 of the partition wall is thicker than a basic partition wall thickness T00 in the circumferential cell structure; and at least one of a first boundary reinforcing region in which a thickness T11 of the partition wall is thicker than the basic partition wall thickness T00 in the circumferential cell structure and a second boundary reinforcing region in which a thickness T21 of the partition wall is thicker than a basic partition wall thickness T20 in the central cell structure, the circumferential reinforcing region exists, on the surface orthogonal to the direction of extension of the cells of the honeycomb structure body, in a range excluding a range of a distance L0 from a centroid O of the surface as a starting point, the first boundary reinforcing region exists in a range of a distance L1 from the centroid O as a starting point and in a range of the circumferential cell structure, and the second boundary reinforcing region exists in a range excluding a range of a distance L2 from the centroid O as a starting point within a range of the central cell structure.

[2] The honeycomb structure according to [1], wherein when on the surface orthogonal to the direction of extension of the cells of the honeycomb structure body, a distance r0 is defined as a distance from the centroid O to an outside of the circumferential wall on a virtual straight line extending from the centroid O to the circumferential wall and a distance r1 is defined as a distance from the centroid O to an outside of the boundary wall on the virtual straight line, the honeycomb structure body satisfies a relationship of a following Expression (1).

$$0.5 > (r0 - L0)/(r0 - r1) > 0.1 \qquad (1)$$

[3] The honeycomb structure according to [1] or [2], wherein the thickness T01 (mm) of the partition wall in the circumferential reinforcing region and the basic partition wall thickness T00 (mm) in the circumferential cell structure satisfy a relationship of a following Expression (2).

$$T00+0.0127<T01<T00+0.0381 \quad (2)$$

[4] The honeycomb structure according to any one of [1] to [3], wherein the thickness T11 (mm) of the partition wall in the first boundary reinforcing region and the basic partition wall thickness T00 (mm) in the circumferential cell structure satisfy a relationship of a following Expression (3).

$$T00+0.0127<T11<T00+0.0381 \quad (3)$$

[5] The honeycomb structure according to any one of [1] to [4], wherein the thickness T21 (mm) of the partition wall in the second boundary reinforcing region and the basic partition wall thickness T20 (mm) in the central cell structure satisfy a relationship of a following Expression (4).

$$T20+0.0127<T21<T20+0.0381 \quad (4)$$

[6] The honeycomb structure according to any one of [1] to [5], wherein the central cell structure includes two or more central cell structures and central boundary walls provided in boundary portions between the two or more central cell structures, and the central cell structure includes at least one of a central outer boundary reinforcing region in which a thickness T'n1 of the partition wall is thicker than a basic partition wall thickness T'n0 in the cell structure including this partition wall in a range of a distance L'n outside each of the central boundary walls and a central inner boundary reinforcing region in which a thickness T"m1 of the partition wall is thicker than a basic partition wall thickness T"m0 in the cell structure including this partition wall in a range excluding a range of a distance L"m, inside each of the central boundary walls.

[7] The honeycomb structure according to [6], wherein when on the surface orthogonal to the direction of extension of the cells of the honeycomb structure body, a distance r0 is defined as a distance from the centroid O of the surface to an outside of the circumferential wall and a distance r'n is defined as a distance from the centroid O to each of the central boundary walls, the honeycomb structure body satisfies a relationship of a following Expression (5).

$$0.5>(r0-L0)/(r0-r'n)>0.1 \quad (5)$$

[8] The honeycomb structure according to [6] or [7], wherein the thickness T'n1 (mm) of the partition wall in the central outer boundary reinforcing region and the basic partition wall thickness T'n0 (mm) in the cell structure including this partition wall satisfy a relationship of a following Expression (6).

$$T'n0+0.0127<T'n1<T'n0+0.0381 \quad (6)$$

[9] The honeycomb structure according to any one of [6] to [8], wherein the thickness T"m1 (mm) of the partition wall in the central inner boundary reinforcing region and the basic partition wall thickness T"m0 (mm) in the cell structure including this partition wall satisfy a relationship of a following Expression (7).

$$T"m0+0.0127<T"m1<T"m0+0.0381 \quad (7)$$

[10] The honeycomb structure according to any one of [1] to [9], wherein an array direction of a repeat unit of the cells in the central cell structure is inclined not less than 10° and not more than 45° with respect to an array direction of a repeat unit of the cells in the circumferential cell structure.

Effects of the Invention

The honeycomb structure according to the present invention has an effect of suppressing the deformation of the cell shape generated in the vicinity of the boundary wall and having excellent mechanical strength in the honeycomb structure in which two or more cell structures are separated by the boundary wall.

DESCRIPTION OF THE PREFERRED EMBODIMENTS

Hereinafter, exemplary embodiments of the present invention will be explained. However, the present invention is not limited to the following embodiments. Therefore, it should be understood that modifications, improvements, etc. can be appropriately added to the following embodiments based on the ordinary knowledge of those skilled in the art without departing from the spirit of the present invention.

(1) Honeycomb Structure

A honeycomb structure according to one embodiment of the present invention is a honeycomb structure 100 as shown in FIGS. 1 to 6. The honeycomb structure 100 includes a pillar-shaped honeycomb structure body 4 that includes a porous partition wall 1 and a circumferential wall 3 disposed to surround the outer circumference of the partition wall 1. The partition wall 1 of the honeycomb structure body 4 defines a plurality of cells 2 that acts as fluid through channels extending from an inflow end face 11 to an outflow end face 12.

Figure 1:
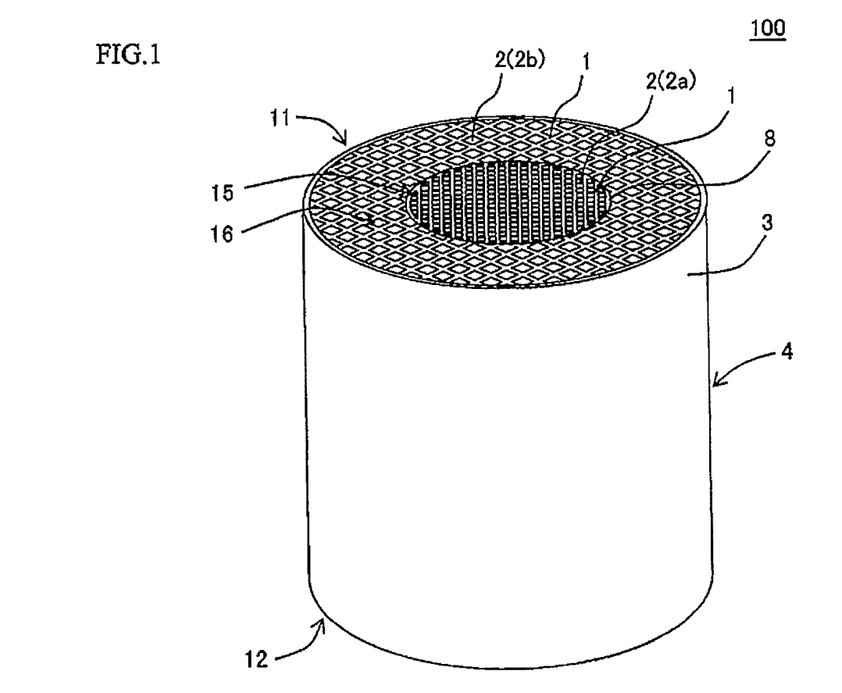
FIG. 1 is a perspective view schematically showing a honeycomb structure according to one embodiment of the present invention.
Figure 2:
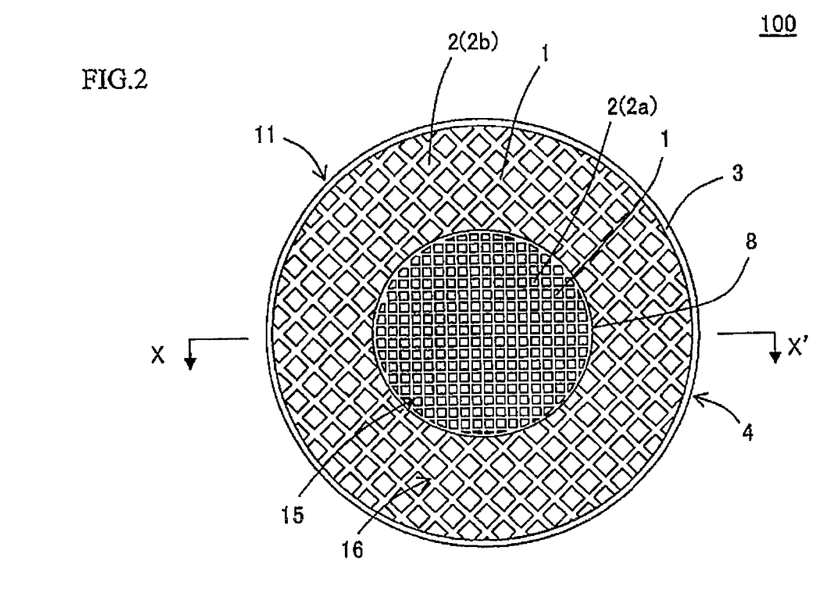
FIG. 2 is a plan view schematically showing an inflow end face of the honeycomb structure shown in FIG. 1.
Figure 3:
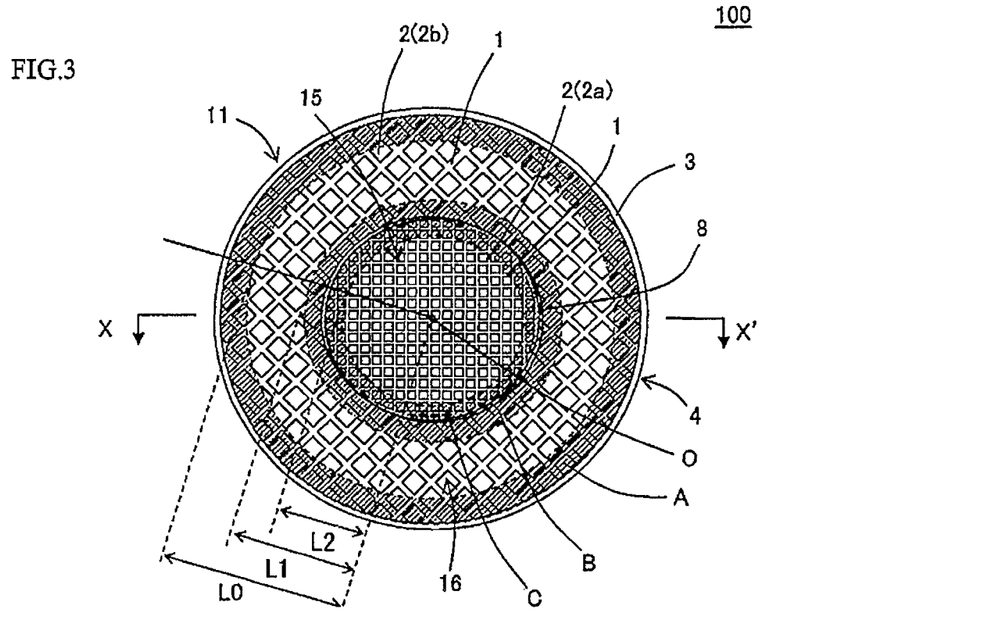
FIG. 3 is an explanatory diagram explaining a circumferential reinforcing region, a first boundary reinforcing region, and a second boundary reinforcing region in FIG. 2.
Figure 4:
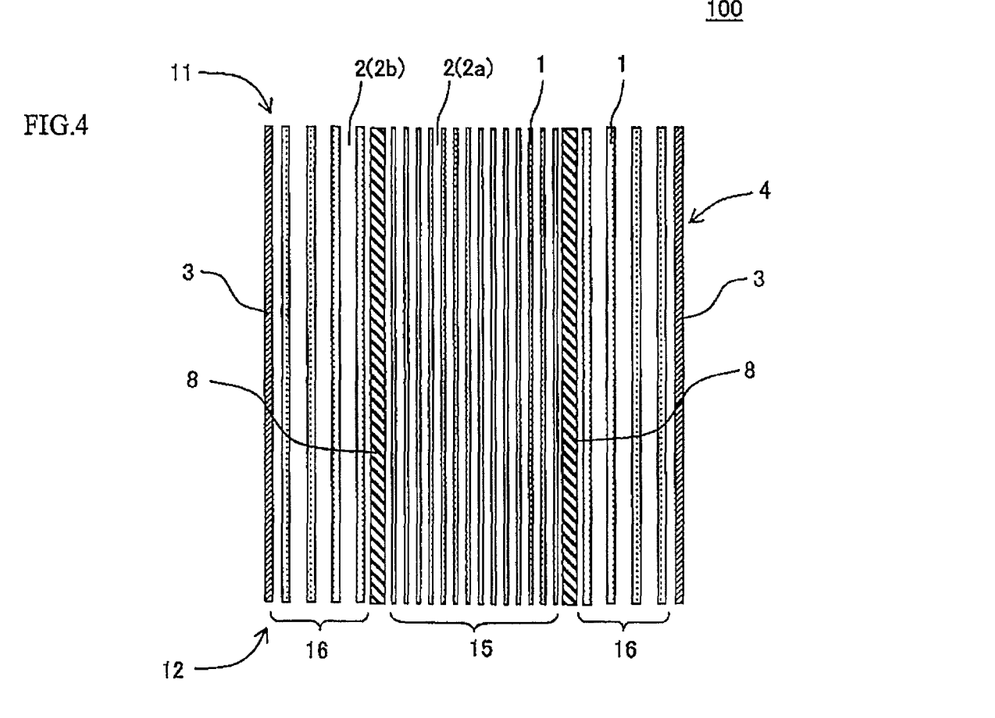
FIG. 4 is a cross-sectional view schematically showing the X-X' cross section of FIG. 2.
Figure 5:
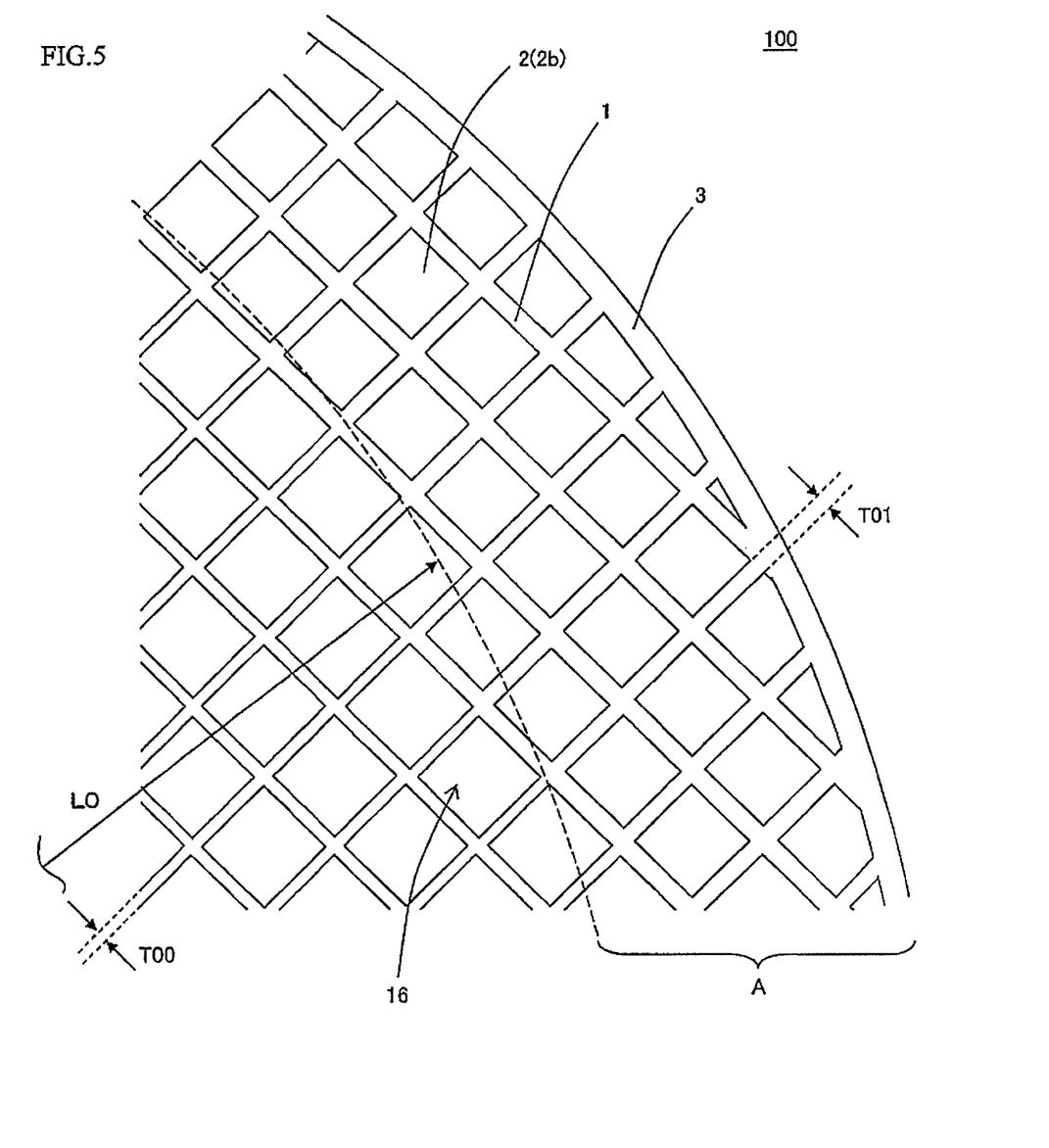
FIG. 5 is an enlarged plan view enlarging a part of the circumferential reinforcing region in FIG. 2.
Figure 6:
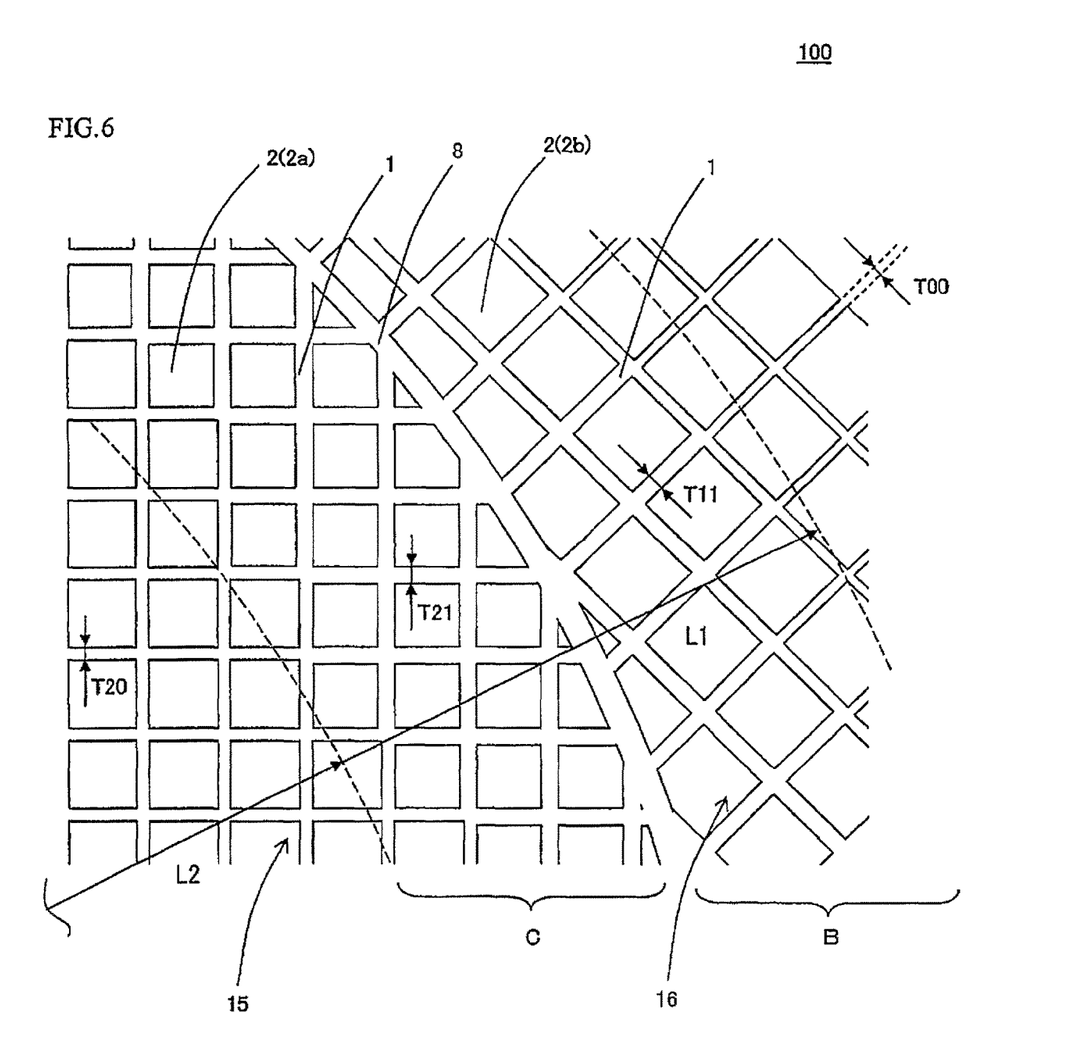
FIG. 6 is an enlarged plan view enlarging a part of the first boundary reinforcing region and the boundary reinforcing region in FIG. 2.

Herein, FIG. 1 is a perspective view schematically showing the honeycomb structure according to one embodiment of the present invention. FIG. 2 is a plan view schematically showing the inflow end face of the honeycomb structure shown in FIG. 1. FIG. 3 is an explanatory diagram explaining a circumferential reinforcing region, a first boundary reinforcing region, and a second boundary reinforcing region in FIG. 2. FIG. 4 is a cross-sectional view schematically showing the X-X' cross section of FIG. 2. FIG. 5 is an enlarged plan view enlarging a part of the circumferential reinforcing region in FIG. 2. FIG. 6 is an enlarged plan view enlarging a part of the first boundary reinforcing region and the second boundary reinforcing region in FIG. 2.

The honeycomb structure 100 according to the present embodiment is characterized in that the honeycomb structure body 4 is configured as described below. The honeycomb structure body 4 includes a circumferential cell structure 16, a central cell structure 15, and a boundary wall 8 disposed in a boundary portion between the circumferential cell structure 16 and the central cell structure 15. In the honeycomb structure body 4, the central cell structure 15 and the circumferential cell structure 16 have different cell structures. Herein, the central cell structure 15 means a structure constituted by a plurality of cells $2a$ formed on the central portion of the honeycomb structure body 4 on a surface orthogonal to the direction of extension of the cells 2 of the honeycomb structure body 4. The circumferential cell structure 16 means a structure constituted by a plurality of cells $2b$ formed on the outer circumference of the honeycomb structure body 4 on the surface. Therefore, the central cell structure 15 and the circumferential cell structure 16 means two regions separated by the boundary wall 8. In addition, the more detailed configuration of the central cell structure 15 and the circumferential cell structure 16 will be described later.

The honeycomb structure 100 according to the present embodiment has particularly important features in that the honeycomb structure particularly satisfies the following (a) and satisfies at least one of the following (b) and (c).

(a) The honeycomb structure includes a circumferential reinforcing region A in which a thickness T01 of the partition wall 1 is thicker than a basic partition wall thickness T00 in the circumferential cell structure 16.

(b) The honeycomb structure includes a first boundary reinforcing region B in which a thickness T11 of the partition wall 1 is thicker than the basic partition wall thickness T00 in the circumferential cell structure 16.

(c) The honeycomb structure includes a second boundary reinforcing region C in which a thickness T21 of the partition wall 1 is thicker than a basic partition wall thickness T20 in the central cell structure 15.

Herein, on the surface orthogonal to the direction of extension of the cells 2 of the honeycomb structure body 4, the circumferential reinforcing region A exists in a range excluding a range of a distance L0 from the centroid O of the surface as a starting point. The first boundary reinforcing region B exists in the range of a distance L1 from the centroid O as a starting point and in the range of the circumferential cell structure 16. The second boundary reinforcing region C exists in a range excluding a range of a distance L2 from the centroid O as a starting point within the range of the central cell structure 15. In addition, when a distance L3 is defined as a distance from the centroid O to the boundary wall 8, a relationship of "Distance L2<Distance L3<Distance L1<Distance L0" is established.

When forming a honeycomb formed body by extrusion, the honeycomb structure 100 according to the present embodiment can effectively suppress the change of the shape of the cells 2 in the vicinity of the boundary wall 8 separating the cell structures. For this reason, the decrease in strength due to the deformation of the shape of the cells 2 is hard to occur, and thus the honeycomb structure has a stable mechanical strength. Therefore, the honeycomb structure 100 according to the present embodiment has an effect of suppressing the deformation of the shape of the cells 2 generated in the vicinity of the boundary wall 8 and having an excellent mechanical strength.

It is preferable that the honeycomb structure 100 satisfies the relationship of the following Expression (1). Herein, in the following Expression (I), on the surface orthogonal to the direction of extension of the cells 2 of the honeycomb structure body 4, a distance "r0" is defined as a distance from the centroid O to an outside of the circumferential wall 3 on a virtual straight line extending from the centroid O of the surface to the circumferential wall 3. Moreover, on the surface orthogonal to the direction of extension of the cells 2 of the honeycomb structure body 4, a distance "r1" is defined as a distance from the centroid O to an outside of the boundary wall 8 on the virtual straight line.

$$0.5 > (r0-L0)/(r0-r1) > 0.1 \qquad (1)$$

To satisfy the relationship of the Expression (1) has an effect that the strength is improved. In addition, when the value of "(r0−L0)/(r0−r1)" is equal to or more than 0.5, the increase in the mass of the honeycomb structure 100 may grow larger. Moreover, when the value of "(r0−L0)/(r0−r1)" is equal to or less than 0.1, sufficient strength improvement may not be developed.

It is preferable that the thickness T01 (mm) of the partition wall 1 in the circumferential reinforcing region A and the basic partition wall thickness T00 (mm) in the circumferential cell structure 16 satisfy the relationship of the following Expression (2). To satisfy the relationship of the following Expression (2) has an effect that the strength is improved.

$$T00+0.0127 < T01 < T00+0.0381 \qquad (2)$$

It is preferable that the thickness T11 (mm) of the partition wall 1 in the first boundary reinforcing region B and the basic partition wall thickness T00 (mm) in the circumferential cell structure 16 satisfy the relationship of the following Expression (3). To satisfy the relationship of the following Expression (3) has an effect that the strength is improved.

$$T00+0.0127 < T11 < T00+0.0381 \qquad (3)$$

It is preferable that the thickness T21 (mm) of the partition wall 1 in the second boundary reinforcing region C and the basic partition wall thickness T20 (mm) in the central cell structure 15 satisfy the relationship of the following Expression (4). To satisfy the relationship of the following Expression (4) has an effect that the strength is improved.

$$T20+0.0127 < T21 < T20+0.0381 \qquad (4)$$

In the present invention, the circumferential cell structure 16 means a cell structure constituted by the cells $2b$ existing between the circumferential wall 3 and the boundary wall 8 of the honeycomb structure body 4. For this reason, the circumferential cell structure 16 can be called a cell structure that includes complete cells formed on the outermost circumference of the honeycomb structure body 4. Hereinafter, among the cells 2, cells in which all portions around each cell are defined by the partition wall 1 may be called "complete cells". On the other hand, among the cells 2, cells in which all portions around each cell are not defined by the partition wall 1 and any portion around each the cell is defined by the circumferential wall 3 may be called "incomplete cells". Moreover, cells in which any portion around each cell is defined by the boundary wall 8 may be also called "incomplete cells". The formed cells 2 of the honeycomb structure body 4 can be classified into "complete cells" and "incomplete cells" as described above.

In the present invention, the central cell structure 15 means a cell structure constituted by the cells $2a$ existing inside the boundary wall 8. For this reason, the central cell structure 15 can be called a cell structure that includes complete cells formed inside the boundary wall 8 of the honeycomb structure body 4.

When a combination of one cell or two or more cells of the cells 2 defined by the partition wall 1 is one repeat unit on the surface orthogonal to the direction of extension of the cells 2, a "cell structure" means a structure that includes two or more repeat units. For example, when the cells 2 having the same cell shape are regularly arrayed on the surface, a range in which the cells 2 having the same cell shape are included can be regarded as one cell structure. In addition, although it is not shown, when a combination of a plurality of cells acts as one repeat unit even if the cells have different cell shapes, a range in which the repeat unit exists can be regarded as one cell structure. In the honeycomb structure 100 according to the present embodiment, each of the central cell structure 15 and the circumferential cell structure 16 includes at least one kind of cell structures.

In the honeycomb structure 100 according to the present embodiment, the thickness of the partition wall 1 defining the cells 2 may be partially thickened by satisfying each condition of the above (a), (b), and (c). In this case, when the shape of the cells 2 defined by the partition wall 1 is similarly reduced by the thickness of the partition wall 1 with respect to the shape of the cells 2 acting as a repeat unit, the cells 2 that are similarly reduced are also treated as one of repeat units.

In the present invention, that two cell structures are "different cell structures" means that any one of a cell density and a cell shape is different between them when comparing the two cell structures. That "a cell density is different" means that the cell densities have a difference not less than 7 cells/cm$^2$ when comparing the cell densities of the two cell structures.

Herein, "the distance L0", "the distance L1", and "the distance L2" can be measured as described below. In other words, each distance is measured from the centroid O as a starting point on a straight line passing through the centroid O and the circumferential wall 3.

"The basic partition wall thickness T00" in the circumferential cell structure 16 can be measured as described below. The thickness of the partition wall 1 located at a fixed distance from the circumferential wall 3 is measured at 6 points in total by 1 point every 60° clockwise around the centroid O to calculate its average value within a range not included in a reinforcing region among regions constituting the circumferential cell structure 16. In addition, the "reinforcing region" means a region in which the thickness of the partition wall 1 is partially thickened.

"The thickness T01 of the partition wall 1 of the circumferential reinforcing region A" in the circumferential cell structure 16 can be measured as described below. The thickness of the partition wall 1 located at a fixed distance from the circumferential wall 3 is measured at 6 points in total by 1 point every 60° clockwise around the centroid O to calculate its average value in the range excluding the range of the distance L0 from the centroid O as a starting point.

"The thickness T11 of the partition wall 1 of the first boundary reinforcing region 13" in the circumferential cell structure 16 can be measured as described below. The thickness of the partition wall 1 located at a fixed distance from the circumferential wall 3 is measured at 6 points in total by 1 point every 60° clockwise around the centroid O to calculate its average value within a region that is in the range of the distance L1 from the centroid O and constitutes the circumferential cell structure 16.

"The basic partition wall thickness T20" in the central cell structure 15 can be measured as described below. The thickness of the partition wall 1 located at a fixed distance from the circumferential wall 3 is measured at 6 points in total by 1 point every 60° clockwise around the centroid O to calculate its average value within the range not included in the reinforcing region.

"The thickness T21 of the partition wall 1 of the second boundary reinforcing region C" in the central cell structure 15 can be measured as described below. The thickness of the partition wall 1 located at a fixed distance from the circumferential wall 3 is measured at 6 points in total by 1 point every 60° clockwise around the centroid O to calculate its average value within a range excluding the range of the distance L2 from the centroid O among regions constituting the central cell structure 15.

The shape of each of the cells 2 on the surface orthogonal to the direction of extension of the cells 2 has no particular limitation. For example, the shape of the cells 2 that constitute the central cell structure 15 and the circumferential cell structure 16 can include a polygonal shape such as a triangle, a quadrangle, a hexagon, and an octagon. Moreover, the cells 2 constituting each of the central cell structure 15 and the circumferential cell structure 16 may include the one cell 2 and the other cell 2 that have different shapes.

In the honeycomb structure 100 according to the present embodiment, it is preferable that the cell density of the central cell structure 15 is larger than the cell density of the circumferential cell structure 16. The honeycomb structure 100 having such the configuration is preferable in that, on the surface orthogonal to the direction of extension of the cells 2, it is possible to make it easier for exhaust gas to flow into the circumferential cells 2 and the exhaust gas can be efficiently brought into contact with the honeycomb structure 100 and be purified.

The cell density in the central cell structure 15 is preferably 40 to 155 cells/cm$^2$, is further preferably 60 to 140 cells/cm$^2$, and is particularly preferably 75 to 110 cells/cm$^2$. When the cell density in the central cell structure 15 is less than 40 cells/cm$^2$, the strength of the honeycomb structure 100 may not be secured and exhaust gas may not easily to flow into the outer circumference. Moreover, when the cell density in the central cell structure 15 exceeds 155 cells/cm$^2$, the pressure loss of the honeycomb structure 100 may be increased and, when loading a catalyst, the clogging of the cells 2 may occur due to the loaded catalyst.

The cell density in the circumferential cell structure 16 is preferably 15 to 95 cells/cm$^2$, is further preferably 30 to 80 cells/cm$^2$, and is particularly preferably 40 to 65 cells/cm$^2$. When the cell density in the circumferential cell structure 16 is less than 15 cells/cm$^2$, the strength of the honeycomb structure 100 may be short. Moreover, when the cell density in the circumferential cell structure 16 exceeds 95 cells/cm$^2$, the pressure loss of the honeycomb structure 100 may be increased and, when loading a catalyst, the clogging of the cells 2 may occur due to the loaded catalyst.

The basic partition wall thickness T20 in the central cell structure 15 is preferably 0.05 to 0.21 mm, is further preferably 0.05 to 0.16 mm, and is particularly preferably 0.05 to 0.12 mm. When the thickness of the partition wall 1 in the central cell structure 15 is too thin, it is not preferable in that the strength of the honeycomb structure 100 cannot be secured and it becomes difficult to cause exhaust gas to flow into the outer circumference. When the thickness of the partition wall 1 in the central cell structure 15 is too thick, it is not preferable in that the pressure loss of the honeycomb structure 100 is increased and, when loading a catalyst, the clogging of the cells 2 occurs due to the loaded catalyst.

The basic partition wall thickness T00 in the circumferential cell structure 16 is preferably 0.07 to 0.23 mm, is further preferably 0.07 to 0.18 mm, and is particularly preferably 0.07 to 0.15 mm. When the thickness of the partition wall 1 in the circumferential cell structure 16 is too thin, it is not preferable in that the strength of the honeycomb structure 100 cannot be secured and it becomes difficult to cause exhaust gas to flow into the outer circumference. When the thickness of the partition wall 1 in the circumferential cell structure 16 is too thick, it is not preferable in that the pressure loss of the honeycomb structure 100 is increased and, when loading a catalyst, the clogging of the cells 2 occurs due to the loaded catalyst.

The thickness of the circumferential wall 3 is preferably 0.2 to 1.0 mm, is further preferably 0.3 to 0.8 mm, and is particularly preferably 0.4 to 0.6 mm. When the thickness of the circumferential wall 3 is too thin, it is not preferable in that the mechanical strength of the entire honeycomb structure 100 is decreased. When the thickness of the circumferential wall 3 is too thick, it is not preferable in that the open area of the cells 2 of the honeycomb structure 100 may be decreased and the pressure loss may be increased.

The thickness of the boundary wall 8 is preferably 0.01 to 1.00 mm, is further preferably 0.05 to 0.90 mm, and is particularly preferably 0.10 to 0.80 mm. When the thickness of the boundary wall 8 is too thin, it is not preferable in terms of ensuring the strength. When the thickness of the boundary wall 8 is too thick, it is not preferable in that the open area of the cells 2 of the honeycomb structure 100 may be decreased and the pressure loss may be increased.

The honeycomb structure 100 shown in FIGS. 1 to 6 is in a state where the array direction of the repeat unit of the cells 2a in the central cell structure 15 is inclined with respect to the array direction of the repeat unit of the cells 2b in the circumferential cell structure 16. In other words, the repeat unit of the cells 2a in the central cell structure 15 is arranged in the lateral direction on a paper space in FIG. 2. On the other hand, the repeat unit of the cells 2b in the circumferential cell structure 16 is arranged in a direction inclined obliquely with respect to the lateral direction on the paper space in FIG. 2. By employing such the configuration, the occurrence of stress concentration at specific points can be suppressed and it is effective in ensuring the strength. In addition, in the honeycomb structure 100 according to the present embodiment, the array direction of the repeat unit of the cells 2a in the central cell structure 15 may be parallel to the array direction of the repeat unit of the cells 2b in the circumferential cell structure 16.

In the honeycomb structure 100, the size of an angle between the array direction of the repeat unit of the cells 2b in the circumferential cell structure 16 and the array direction of the repeat unit of the cells 2a in the central cell structure 15 has no particular limitation. In this regard, however, when the array direction of the repeat unit of the cells 2a in the central cell structure 15 is inclined with respect to the array direction of the repeat unit of the cells 2b in the circumferential cell structure 16, it is preferable that the inclination is not less than 10° and not more than 45°. In the angular range as described above, the above effect can be effectively developed by inclining the array directions of the repeat units of the cells 2a and 2b. For example, in the honeycomb structure 100 shown in FIGS. 1 to 6, the size of the angle between the array direction of the repeat unit of the cells 2b in the circumferential cell structure 16 and the array direction of the repeat unit of the cells 2a in the central cell structure 15 is 45°.

The porosity of the partition wall 1 of the honeycomb structure body 4 is preferably 10 to 55%, is further preferably 20 to 45%, and is particularly preferably 25 to 35%. When the porosity of the partition wall 1 is less than 10%, the pressure loss may be increased when the honeycomb structure 100 is used as a filter. When the porosity of the partition wall 1 exceeds 55%, the strength of the honeycomb structure 100 becomes insufficient and thus it becomes difficult to hold the honeycomb structure 100 with a sufficient gripping force when housing the honeycomb structure 100 inside a can body used for an exhaust gas purification device. The porosity of the partition wall 1 is a value measured by a mercury porosimeter. For example, the mercury porosimeter can include Autopore 9500 (product name) made by Micromeritics Corp.

The material of the partition wall 1 has no particular limitation. From the viewpoint of strength, heat resistance, durability, etc., it is preferable that the material of the partition wall 1 includes various ceramics, metal, etc. of oxide or non-oxide as a principal component. More specifically, ceramics can include a material that contains at least one kind selected from a material group consisting of cordierite, mullite, alumina, spinel, silicon carbide, silicon nitride, and aluminum titanate, for example. Moreover, metal can include Fe—Cr—Al based metal, metallic silicon, and the like. It is preferable that one kind or two or more kinds selected from among these materials is/are used as the main component of the material of the partition wall 1. From the viewpoint of high strength, high heat resistance, etc., it is particularly preferable to contain as a main component one kind or two or more kinds selected from a material group consisting of alumina, mullite, aluminum titanate, cordierite, silicon carbide, and silicon nitride. Moreover, from the viewpoint of high thermal conductivity, high heat resistance, etc., silicon carbide or silicon-silicon carbide composite material is especially suitable. Herein, the "principal component" means, among the components, a component whose amount is 50% by mass or more, is preferably 70% by mass or more, and is further preferably 80% by mass or more.

From the viewpoint of strength, heat resistance, durability, etc., it is preferable that the material of the boundary wall 8 includes various ceramics, metal, etc. of oxide or non-oxide as a principal component. It is preferable that the material of the boundary wall 8 is the same as the material of the partition wall 1.

From the viewpoint of strength, heat resistance, durability, etc., it is preferable that the material of the circumferential wall 3 includes various ceramics, metal, etc. of oxide or non-oxide as a principal component. It is preferable that the material of the circumferential wall 3 is the same as the material of the partition wall 1. In the honeycomb structure 100 according to the present embodiment, it is particularly preferable that the partition wall 1, the boundary wall 8, and the circumferential wall 3 are an integrally formed product formed by single extrusion.

The entire shape of the honeycomb structure 100 has no particular limitation. In the entire shape of the honeycomb structure 100 according to the present embodiment, it is preferable that the shape of the inflow end face 11 and the outflow end face 12 is a circular shape or an elliptical shape. It is especially preferable that the shape is a circular shape. Moreover, the size of the honeycomb structure 100 has no particular limitation. It is preferable that the length from the inflow end face 11 to the outflow end face 12 is 50 to 254 mm. Moreover, when the entire shape of the honeycomb structure 100 is a round pillar shape, it is preferable that that the diameter of each end face is 50 to 254 mm.

The honeycomb structure 100 according to the present embodiment can be preferably used as an exhaust gas purification member of an internal combustion engine. For example, the honeycomb structure can be preferably used as a catalyst carrier to load a catalyst for exhaust gas purification. The honeycomb structure 100 according to the present embodiment may load a catalyst for exhaust gas purification on/in at least one of the surface of the partition wall 1 and the pores of the partition wall 1 of the honeycomb structure body 4.

Although it is not shown, the honeycomb structure according to the present embodiment may further include plugging portions arranged on one of both ends of the cells defined by the partition wall. The plugging portions are arranged at the open ends of the cells on the inflow end face or the outflow end face to seal one of both ends of the cells. The honeycomb structure that further includes the plugging portions can be used as a filter for removing particulate matter in exhaust gas.

Figure 7:
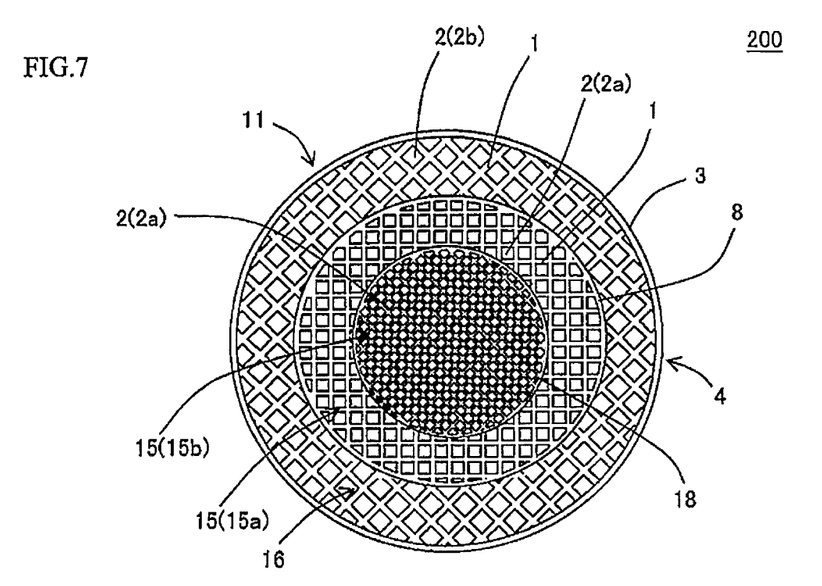
FIG. 7 is a plan view schematically showing an inflow end face of a honeycomb structure according to another embodiment of the present invention.
Figure 8:
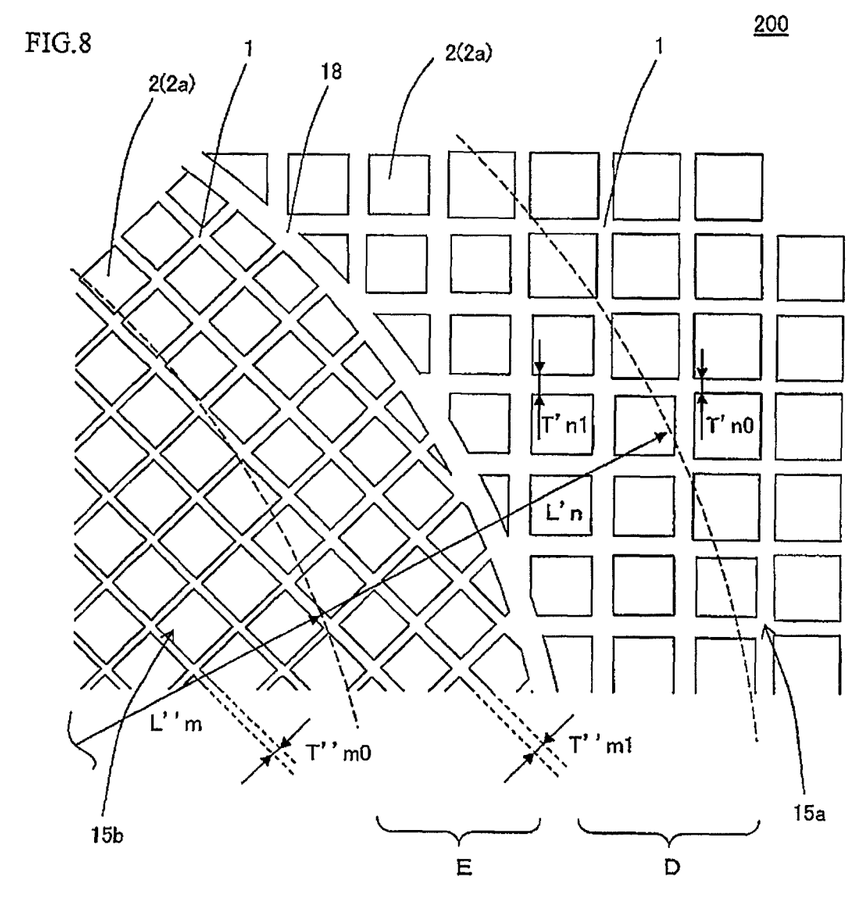
FIG. 8 is an enlarged plan view enlarging a part of a central outer boundary reinforcing region and a central inner boundary reinforcing region in FIG. 7.

Next, a honeycomb structure according to another embodiment of the present invention will be explained with reference to FIGS. 7 and 8. FIG. 7 is a plan view schematically showing the inflow end face of a honeycomb structure according to another embodiment of the present invention. FIG. 8 is an enlarged plan view enlarging a part of a central outer boundary reinforcing region and a central inner boundary reinforcing region in FIG. 7.

As shown in FIGS. 7 and 8, the honeycomb structure 200 according to the present embodiment includes the pillar-shaped honeycomb structure body 4 that includes the porous partition wall 1 and the circumferential wall 3 disposed to surround the outer circumference of the partition wall 1. The honeycomb structure body 4 includes the central cell structure 15, the circumferential cell structure 16, and the boundary wall 8 on the surface orthogonal to the direction of extension of the cells 2. In the honeycomb structure 200, the central cell structure 15 and the circumferential cell structure 16 have different cell structures.

In the honeycomb structure 200 shown in FIGS. 7 and 8, the central cell structure 15 further has two kinds or more cell structures that have different cell structures. In other words, in the honeycomb structure 200, the central cell structure 15 includes a first central cell structure 15a existing inside the boundary wall 8 and a second central cell structure 15b existing further inside the first central cell structure 15a. The first central cell structure 15a has an annular shape surrounding the second central cell structure 15b. Moreover, the central cell structure includes a central boundary wall 18 that defines the boundary between the first central cell structure 15a and the second central cell structure 15b in a boundary portion therebetween. Herein, the "central boundary wall 18" means a boundary wall existing in a boundary portion between the dual-arranged two cell structures of the central cell structure 15. In addition, the central cell structure 15 is not limited to two kinds of cell structures as shown in FIGS. 7 and 8. Although it is not shown, the central cell structure may have three kinds or more cell structures.

As shown in FIGS. 7 and 8, when the central cell structure 15 has the central boundary wall 18 and has two kinds or more cell structures, it is preferable that the honeycomb structure 200 satisfies at least one of the following (d) and (e).

(d) The central cell structure includes a central outer boundary reinforcing region D in which a thickness T'n1 of the partition wall 1 is thicker than a basic partition wall thickness T'n0 in the cell structure including the partition wall 1 in a region outside from the central boundary wall 18 and in a range of a distance L'n from the centroid O as a starting point. (e) The central cell structure includes a central inner boundary reinforcing region E in which a thickness T"m1 of the partition wall 1 is thicker than a basic partition wall thickness T"m0 in the cell structure including the partition wall 1 in a region inside from the central boundary wall 18 and in a range excluding a range of a distance L"m from the centroid O as a starting point.

When satisfying at least one of the above (d) and (e), the change of the shape of the cells 2 can be effectively suppressed in the vicinity of the central boundary wall 18 separating the cell structures when a honeycomb formed body is formed by extrusion. For this reason, the decrease in strength due to the deformation of the shape of the cells 2 is hard to occur so as to achieve stable strength. Therefore, the honeycomb structure 200 suppresses the deformation of the shape of the cells 2 generated in the vicinity of the central boundary wall 18 and has an effect that a mechanical strength is excellent.

In "the distance L'n", "the basic partition wall thickness T'n0", and "the thickness T'n1 of the partition wall 1" of the above (d), "n" is a symbol corresponding to each of the cell structures separated by the central boundary wall 18, and means "n=1, 2, 3, . . . ". For example, the first central cell structure 15a includes the central outer boundary reinforcing region D in which a thickness T11 of the partition wall 1 is thicker than a basic partition wall thickness T'10 in the cell structure including the partition wall 1 in a range of a distance L'1 outside from the first central cell structure 15a.

In "the distance L"m", "the basic partition wall thickness T"m0", and "the thickness T"m1 of the partition wall 1" of the above (e), "m" is a symbol corresponding to each of the cell structures separated by the central boundary wall 18, and means "m=2, 3, . . . ". For example, the second central cell structure 15b includes the central inner boundary reinforcing region E in which a thickness T"21 of the partition wall 1 is thicker than a basic partition wall thickness T"20 in the cell structure including the partition wall 1 in a range of a distance L"2 inside from the second central cell structure 15b.

It is preferable that the honeycomb structure 200 satisfies the relationship of the following Expression (5). Herein, in the following Expression (5), on the surface orthogonal to the direction of extension of the cells 2 of the honeycomb structure body 4, a distance r0 is defined as a distance from the centroid O of the surface to an outside of the circumferential wall 3, and a distance r'n is defined as a distance from the centroid O of the surface to each point of the central boundary wall 18.

$$0.5 > (r0 - L0)/(r0 - r'n) > 0.1 \tag{5}$$

To satisfy the relationship of the above Expression (5) has an effect that the strength is improved. In addition, when the value of "$(r0-L0)/(r0-r'n)$" is equal to or more than 0.5, the increase in mass may grow larger. Moreover, when the value of "$(r0-L0)/(r0-r'n)$" is equal to or less than 0.1, sufficient strength improvement may not be developed.

It is preferable that the thickness T'n1 (*mm*) of the partition wall 1 in the central outer boundary reinforcing region D and the basic partition wall thickness T'n0 (*mm*) in the cell structure including the partition wall 1 satisfy the relationship of the following Expression (6). To satisfy the relationship of the following Expression (6) has an effect that the strength is improved.

$$T'n0 + 0.0127 < T'n1 < T'n0 + 0.0381 \tag{6}$$

It is preferable that the thickness T″m1 (mm) of the partition wall 1 in the central inner boundary reinforcing region E and the basic partition wall thickness T″m0 (mm) in the cell structure including the partition wall 1 satisfy the relationship of the following Expression (7). To satisfy the relationship of the following Expression (7) has an effect that the strength is improved.

$$T''m0+0.0127<T''m1<T''m0+0.0381 \tag{7}$$

In the honeycomb structure 200, it is preferable that various conditions such as the thickness of the central boundary wall 18 are configured similarly to the boundary wall 8 that separates the central cell structure 15 and the circumferential cell structure 16. Moreover, the thickness T′n1 (mm) of the partition wall 1 in the central outer boundary reinforcing region D and the thickness T″m1 (mm) of the partition wall 1 in the central inner boundary reinforcing region E can be measured by the same method as that in "the thickness T11 of the partition wall in the first boundary reinforcing region".

(2) Honeycomb Structure Manufacturing Method

Next, a method of manufacturing the honeycomb structure according to the present invention will be explained.

First, a plastic kneaded material to make a honeycomb structure body is prepared. The kneaded material to make the honeycomb structure body can be prepared by appropriately adding water and an addition agent such as a binder to a material selected as raw material powder from the preferable material group of the partition wall described above.

Next, a pillar-shaped honeycomb formed body having a partition wall defining a plurality of cells and a circumferential wall disposed on the outermost circumference is obtained by extruding the prepared kneaded material. In the extrusion, a die for extrusion can employ a die in which a slit having the inverted shape of the honeycomb formed body to be formed is formed on the extruded surface of the kneaded material. Particularly, when manufacturing the honeycomb structure according to the present invention, it is preferable that a die for extrusion employs a die in which a slit is formed so that a cell structure is different between the central portion and the circumferential portion of the honeycomb formed body to be extruded. Moreover, in the die to be used, it is preferable that a circular slit is formed at a boundary between the central portion and the circumferential portion having different cell structures. A boundary wall separating the circumferential cell structure and the central cell structure is formed by such a circular slit.

When forming the honeycomb formed body, it is preferable that the honeycomb structure that is finally obtained is extruded so that the honeycomb structure satisfies the following (a') and satisfies at least one of the following (b') and (c').

(a') The honeycomb structure includes a circumferential reinforcing region in which the thickness T01 of the partition wall 1 is thicker than the basic partition wall thickness T00 in the circumferential cell structure 16 (e.g., see FIG. 5).

(b') The honeycomb structure includes a first boundary reinforcing region in which the thickness T11 of the partition wall 1 is thicker than the basic partition wall thickness T00 in the circumferential cell structure 16 (e.g., see FIG. 6).

(c') The honeycomb structure includes a second boundary reinforcing region in which the thickness T21 of the partition wall 1 is thicker than the basic partition wall thickness T20 in the central cell structure 15 (e.g., see FIG. 6).

Herein, the circumferential reinforcing region exists in a range excluding a range of the distance L0 from the centroid O of the surface as a starting point on the surface orthogonal to the direction of extension of the cells of the honeycomb structure body. The first boundary reinforcing region exists in the range of the distance L1 from the centroid O as a starting point and in the range of the circumferential cell structure. The second boundary reinforcing region exists in a range excluding a range of the distance L2 from the centroid O as a starting point within the range of the central cell structure.

The obtained honeycomb formed body may be dried by using a microwave and hot air, for example. Moreover, plugging portions may be arranged by plugging the open ends of the cells with the same material as the material used for manufacturing the honeycomb formed body.

Next, the honeycomb structure is obtained by firing the obtained honeycomb formed body. A firing temperature and a firing environment are different depending on a raw material, and those skilled in the art can select the most suitable firing temperature and firing environment for the selected material. In addition, the method of manufacturing the honeycomb structure according to the present invention is not limited to the method described above.

EXAMPLES

Hereinafter, the present invention will be described in further detail based on Examples, but the present invention is not limited to these Examples.

Example 1

A kneaded material was prepared by adding a dispersing medium of 35 parts by mass, an organic binder of 6 parts by mass, and a dispersing agent of 0.5 parts by mass to a cordierite forming raw material of 100 parts by mass and by mixing and kneading these. Alumina, aluminum hydroxide, kaolin, talc, and silica were employed as the cordierite forming raw material. Water was used as the dispersing medium, coke having an average particle diameter of 1 to 10 μm was used as the pore former, hydroxypropyl methylcellulose was used as the organic binder, and ethylene glycol was used as the dispersing agent.

Next, a honeycomb formed body whose entire shape is a round pillar shape was obtained by extruding the kneaded material by using a die for forming the honeycomb formed body. In the extrusion, a die for extrusion employed a die in which a slit is formed so that a cell structure is different between the central portion and the circumferential portion of the honeycomb formed body to be extruded.

Next, the honeycomb formed body was adjusted to a predetermined size by drying the honeycomb formed body with a microwave dryer and further completely drying the body with a hot-air drying machine and then cutting both end faces of the honeycomb formed body.

Next, a honeycomb structure according to Example 1 was manufactured by degreasing and firing the dried honeycomb formed body. The honeycomb structure according to Example 1 had a round pillar shape whose diameter of an end face is 118 mm. The length of the cell in the direction of extension of the cells of the honeycomb structure according to Example 1 was 127 mm.

The honeycomb structure according to Example 1 was configured so that, on the surface orthogonal to the direction of extension of the cells, the circumferential cell structure formed on the outer circumference of the honeycomb structure body and the central cell structure formed on the central portion inside from the circumferential cell structure have different structures. Herein, the honeycomb structure according to Example 1 was configured as described below. The honeycomb structure body of the honeycomb structure has included the circumferential reinforcing region in which the thickness T01 of the partition wall is thicker than the basic partition wall thickness T00 in the circumferential cell structure. Moreover, the honeycomb structure body has included the first boundary reinforcing region in which the thickness T11 of the partition wall is thicker than the basic partition wall thickness T00 in the circumferential cell structure. In addition, the basic partition wall thickness T00 was 0.0900 mm, the thickness T01 of the partition wall was 0.0905 mm, and the thickness T11 of the partition wall was 0.0905 mm. The results are shown in Table 1. In addition, in Table 1, "T20" shows a basic partition wall thickness in the central cell structure, and "T21" shows the thickness (the thickness of the partition wall in the second boundary reinforcing region when having the second boundary reinforcing region) of the partition wall in the central cell structure. In the honeycomb structure according to Example 1, both the thickness T20 of the partition wall and the thickness T21 of the partition wall were 0.0640 mm.

In the honeycomb structure according to Example 1, the circumferential reinforcing region as described above has existed in a range excluding a range of the distance L0 from the centroid O of the surface as a starting point on the surface orthogonal to the direction of extension of the cells of the honeycomb structure body. The distance L0 is 58 mm. The first boundary reinforcing region has existed in a range of the distance L1 from the centroid O as a starting point and in a range of the circumferential cell structure. The distance L1 is 47 mm. The results are shown in Table 1.

Moreover, when on the virtual straight line extending from the centroid O to the circumferential wall on the surface orthogonal to the direction of extension of the cells of the honeycomb structure body, the distance r0 from the centroid O to an outside of the circumferential wall is 59 mm and the distance r1 from the centroid O to an outside of the boundary wall is 42 mm, the value of "(r0−L0)/(r0−r1)" was obtained. This value was 0.06.

"Isostatic strength evaluation" and "mass evaluation" were performed on the honeycomb structure according to Example 1 in the following method. Moreover, "comprehensive evaluation" was performed by the following evaluation criteria based on each evaluation result.

Isostatic Strength Evaluation

The measurement of isostatic strength was performed based on an isostatic breaking strength test regulated by M505-87 of automotive standards (JASO standard) issued by Society of Automotive Engineers of Japan, Inc. The isostatic breaking strength test is a test of putting the honeycomb structure in a rubber tubular container, lidding the container with an aluminum plate, and performing isotropic pressure compression underwater. In other words, the isostatic breaking strength test is a test of simulating compression load weighting when the circumferential surface of the honeycomb structure is gripped in the can body. The isostatic strength measured by this isostatic breaking strength test is shown with a pressurized pressure value (MPa) when the honeycomb structure is broken. The decision criterion in the isostatic strength evaluation according to the present embodiment is as follows.

Evaluation A: Isostatic strength is improved not less than 100% relative to Comparative Example 1.

Evaluation B: Isostatic strength is improved not less than 75% and less than 100% relative to Comparative Example 1.

Evaluation C: Isostatic strength is improved not less than 50% and less than 75% relative to Comparative Example 1.

Evaluation D: Isostatic strength is improved not less than 25% and less than 50% relative to Comparative Example 1.

Evaluation E: Isostatic strength is not improved relative to Comparative Example 1.

Mass Evaluation

The mass of the honeycomb structure was measured to perform the evaluation by the following decision criterion.

Evaluation A: The mass is increased less than 5% relative to Comparative Example 1.

Evaluation B: The mass is increased not less than 5% and less than 10% relative to Comparative Example 1.

Evaluation C: The mass is increased not less than 10% relative to Comparative Example 1.

Comprehensive Evaluation

The comprehensive evaluation was performed by the following evaluation criteria.

Evaluation A: A case where isostatic strength evaluation is A and mass evaluation is A or B.

Evaluation B: A case where isostatic strength evaluation is A and mass evaluation is C or a case where isostatic strength evaluation is B and mass evaluation is A or B.

Evaluation C: A case where isostatic strength evaluation is B and mass evaluation is C, a case where isostatic strength evaluation is C and mass evaluation is B or C, or a case where isostatic strength evaluation is D and mass evaluation is A or B.

Evaluation D: A case where isostatic strength evaluation is D and mass evaluation is C or a case where isostatic strength evaluation is E.

Examples 2 to 26 and Comparative Example 1

Honeycomb structures have been manufactured in the same manner as in Example 1 except that the distance L0 and the thicknesses T00, T01, T11, T20, and T21 of the partition wall are changed as shown in Tables 1 to 4. The honeycomb structures according to Examples 20 to 26 have included the second boundary reinforcing region in which the thickness T21 of the partition wall is thicker than the basic partition wall thickness T20 in the central cell structure.

"Isostatic strength evaluation", "mass evaluation", and "comprehensive evaluation" were performed on the honeycomb structures according to Examples 2 to 26 and Comparative Example 1 in the same manner as in Example 1. The results are shown in Tables 1 to 4.

TABLE 1

|  |  | Comp. Ex. 1 | Example 1 | Example 2 | Example 3 | Example 4 | Example 5 |
|---|---|---|---|---|---|---|---|
| Distance | r0 | 59 | 59 | 59 | 59 | 59 | 59 |
| (mm) | r1 | 42 | 42 | 42 | 42 | 42 | 42 |
|  | L0 | 59 | 58 | 57 | 54 | 51 | 49 |
|  | L1 | 42 | 47 | 47 | 47 | 47 | 47 |
|  | L2 | 42 | 42 | 42 | 42 | 42 | 42 |
| (r0 − L0)/(r0 − r1) |  | 0.00 | 0.06 | 0.12 | 0.29 | 0.46 | 0.58 |

TABLE 1-continued

|  |  | Comp. Ex. 1 | Example 1 | Example 2 | Example 3 | Example 4 | Example 5 |
|---|---|---|---|---|---|---|---|
| Partition wall thickness (mm) | T00 | 0.0900 | 0.0900 | 0.0900 | 0.0900 | 0.0900 | 0.0900 |
|  | T01 | 0.0900 | 0.0905 | 0.0905 | 0.0905 | 0.0905 | 0.0905 |
|  | T11 | 0.0900 | 0.0905 | 0.0905 | 0.0905 | 0.0905 | 0.0905 |
|  | T20 | 0.0640 | 0.0640 | 0.0640 | 0.0640 | 0.0640 | 0.0640 |
|  | T21 | 0.0640 | 0.0640 | 0.0640 | 0.0640 | 0.0640 | 0.0640 |
| Isostatic strength evaluation |  | E | D | C | C | C | B |
| Mass evaluation |  | A | A | B | B | B | C |
| Comprehensive evaluation |  | D | C | C | C | C | C |

TABLE 2

|  |  | Example 6 | Example 7 | Example 8 | Example 9 | Example 10 | Example 11 | Example 12 |
|---|---|---|---|---|---|---|---|---|
| Distance (mm) | r0 | 59 | 59 | 59 | 59 | 59 | 59 | 59 |
|  | r1 | 42 | 42 | 42 | 42 | 42 | 42 | 42 |
|  | L0 | 54 | 54 | 54 | 54 | 54 | 54 | 54 |
|  | L1 | 47 | 47 | 47 | 47 | 47 | 47 | 47 |
|  | L2 | 42 | 42 | 42 | 42 | 42 | 42 | 42 |
| (r0 − L0)/(r0 − r1) |  | 0.29 | 0.29 | 0.29 | 0.29 | 0.29 | 0.29 | 0.29 |
| Partition wall thickness (mm) | T00 | 0.0900 | 0.0900 | 0.0900 | 0.0900 | 0.0900 | 0.0900 | 0.0900 |
|  | T01 | 0.0910 | 0.1027 | 0.1060 | 0.1160 | 0.1210 | 0.1281 | 0.1310 |
|  | T11 | 0.0905 | 0.0905 | 0.0905 | 0.0905 | 0.0905 | 0.0905 | 0.0905 |
|  | T20 | 0.0640 | 0.0640 | 0.0640 | 0.0640 | 0.0640 | 0.0640 | 0.0640 |
|  | T21 | 0.0640 | 0.0640 | 0.0640 | 0.0640 | 0.0640 | 0.0640 | 0.0640 |
| Isostatic strength evaluation |  | C | B | B | B | B | B | A |
| Mass evaluation |  | A | B | B | B | B | B | C |
| Comprehensive evaluation |  | B | B | B | B | B | B | B |

TABLE 3

|  |  | Example 13 | Example 14 | Example 15 | Example 16 | Example 17 | Example 18 | Example 19 |
|---|---|---|---|---|---|---|---|---|
| Distance (mm) | r0 | 59 | 59 | 59 | 59 | 59 | 59 | 59 |
|  | r1 | 42 | 42 | 42 | 42 | 42 | 42 | 42 |
|  | L0 | 54 | 54 | 54 | 54 | 54 | 54 | 54 |
|  | L1 | 47 | 47 | 47 | 47 | 47 | 47 | 47 |
|  | L2 | 42 | 42 | 42 | 42 | 42 | 42 | 42 |
| (r0 − L0)/(r0 − r1) |  | 0.29 | 0.29 | 0.29 | 0.29 | 0.29 | 0.29 | 0.29 |
| Partition wall thickness (mm) | T00 | 0.0900 | 0.0900 | 0.0900 | 0.0900 | 0.0900 | 0.0900 | 0.0900 |
|  | T01 | 0.1160 | 0.1160 | 0.1160 | 0.1160 | 0.1160 | 0.1160 | 0.1160 |
|  | T11 | 0.1010 | 0.1027 | 0.1060 | 0.1160 | 0.1210 | 0.1281 | 0.1310 |
|  | T20 | 0.0900 | 0.0900 | 0.0900 | 0.0900 | 0.0900 | 0.0900 | 0.0900 |
|  | T21 | 0.0900 | 0.0900 | 0.0900 | 0.0900 | 0.0900 | 0.0900 | 0.0900 |
| Isostatic strength evaluation |  | B | A | A | A | A | A | A |
| Mass evaluation |  | A | B | B | B | B | B | C |
| Comprehensive evaluation |  | B | A | A | A | A | A | B |

TABLE 4

|  |  | Example 20 | Example 21 | Example 22 | Example 23 | Example 24 | Example 25 | Example 26 |
|---|---|---|---|---|---|---|---|---|
| Distance (mm) | r0 | 59 | 59 | 59 | 59 | 59 | 59 | 59 |
|  | r1 | 42 | 42 | 42 | 42 | 42 | 42 | 42 |
|  | L0 | 54 | 54 | 54 | 54 | 54 | 54 | 54 |
|  | L1 | 47 | 47 | 47 | 47 | 47 | 47 | 47 |
|  | L2 | 37 | 37 | 37 | 37 | 37 | 37 | 37 |
| (r0 − L0)/(r0 − r1) |  | 0.29 | 0.29 | 0.29 | 0.29 | 0.29 | 0.29 | 0.29 |
| Partition wall thickness (mm) | T00 | 0.0900 | 0.0900 | 0.0900 | 0.0900 | 0.0900 | 0.0900 | 0.0900 |
|  | T01 | 0.1160 | 0.1160 | 0.1160 | 0.1160 | 0.1160 | 0.1160 | 0.1160 |
|  | T11 | 0.0905 | 0.0905 | 0.0905 | 0.0905 | 0.0905 | 0.0905 | 0.0905 |
|  | T20 | 0.0640 | 0.0640 | 0.0640 | 0.0640 | 0.0640 | 0.0640 | 0.0640 |
|  | T21 | 0.0740 | 0.0767 | 0.0790 | 0.0940 | 0.0990 | 0.1021 | 0.1040 |
| Isostatic strength evaluation |  | B | A | A | A | A | A | A |
| Mass evaluation |  | A | B | B | B | B | B | C |
| Comprehensive evaluation |  | B | A | A | A | A | A | B |

(Result)

The honeycomb structures according to Examples 1 to 26 were able to obtain good results in both evaluation of "isostatic strength evaluation" and "mass evaluation". Moreover, in each reinforcing region, it was found that isostatic strength is more improved as the thickness of the partition wall is thicker than the basic partition wall thickness in the corresponding reinforcing region. In this regard, however, it was found that the evaluation result of mass evaluation is more decreased as the thickness of the partition wall becomes thicker. The honeycomb structure according to Comparative Example 1 was a structure that obtains the extremely low evaluation result of isostatic strength evaluation.

INDUSTRIAL APPLICABILITY

The honeycomb structures according to the present invention can be used as a catalyst carrier loading a catalyst to purify exhaust gas emitted from a gasoline engine, a diesel engine, etc. and as a filter to purify the exhaust gas.

DESCRIPTION OF REFERENCE NUMERALS

1: partition wall, 2: cell, 2a: cell (cell in central cell structure), 2b: cell (cell in circumferential cell structure), 3: circumferential wall, 4: honeycomb structure body, 8: boundary wall, 11: inflow end face, 12: outflow end face, 15: central cell structure, 15a: first central cell structure, 15b: second central cell structure, 16: circumferential cell structure, 18: central boundary wall, 100, 200: honeycomb structure, A: circumferential reinforcing region, B: first boundary reinforcing region, C: second boundary reinforcing region, D: central outer boundary reinforcing region, E: central inner boundary reinforcing region.

What is claimed is:

1. A honeycomb structure comprising:
a pillar-shaped honeycomb structure body that includes a porous partition wall that defines a plurality of cells acting as fluid through channels extending from an inflow end face to an outflow end face and a circumferential wall that is disposed to surround an outer circumference of the partition wall, wherein
the honeycomb structure body comprises: on a surface orthogonal to a direction of extension of the cells, a circumferential cell structure that is formed on an outer circumference of the honeycomb structure body; a central cell structure that is formed in a central portion inside from the circumferential cell structure and has a cell structure different from the circumferential cell structure; and a boundary wall that is disposed in a boundary portion between the circumferential cell structure and the central cell structure,
the honeycomb structure body comprises:
a circumferential reinforcing region in which a thickness $T01$ of the partition wall is thicker than a basic partition wall thickness $T00$ in the circumferential cell structure; and
at least one of a first boundary reinforcing region in which a thickness $T11$ of the partition wall is thicker than the basic partition wall thickness $T00$ in the circumferential cell structure and a second boundary reinforcing region in which a thickness $T21$ of the partition wall is thicker than a basic partition wall thickness $T20$ in the central cell structure,
the circumferential reinforcing region exists, on the surface orthogonal to the direction of extension of the cells of the honeycomb structure body, in a range excluding a range of a distance $L0$ from a centroid $O$ of the surface as a starting point,
the first boundary reinforcing region exists in a range of a distance $L1$ from the centroid $O$ as a starting point and in a range of the circumferential cell structure, and the second boundary reinforcing region exists in a range excluding a range of a distance $L2$ from the centroid $O$ as a starting point within a range of the central cell structure.

2. The honeycomb structure according to claim 1, wherein when on the surface orthogonal to the direction of extension of the cells of the honeycomb structure body, a distance $r0$ is defined as a distance from the centroid $O$ to an outside of the circumferential wall on a virtual straight line extending from the centroid $O$ to the circumferential wall and a distance $r1$ is defined as a distance from the centroid $O$ to an outside of the boundary wall on the virtual straight line, the honeycomb structure body satisfies a relationship of a following Expression (1):

$$0.5 > (r0-L0)/(r0-r1) > 0.1 \qquad (1).$$

3. The honeycomb structure according to claim 1, wherein the thickness $T01$ (mm) of the partition wall in the circumferential reinforcing region and the basic partition wall thickness $T00$ (mm) in the circumferential cell structure satisfy a relationship of a following Expression (2):

$$T00+0.0127 < T01 < T00+0.0381 \qquad (2).$$

4. The honeycomb structure according to claim 1, wherein the thickness $T11$ (mm) of the partition wall in the first boundary reinforcing region and the basic partition wall thickness $T00$ (mm) in the circumferential cell structure satisfy a relationship of a following Expression (3):

$$T00+0.0127 < T11 < T00+0.0381 \qquad (3).$$

5. The honeycomb structure according to claim 1, wherein the thickness $T21$ (mm) of the partition wall in the second boundary reinforcing region and the basic partition wall thickness $T20$ (mm) in the central cell structure satisfy a relationship of a following Expression (4):

$$T20+0.0127 < T21 < T20+0.0381 \qquad (4).$$

6. The honeycomb structure according to claim 1, wherein the central cell structure includes two or more central cell structures and central boundary walls provided in boundary portions between the two or more central cell structures, and
the central cell structure includes at least one of a central outer boundary reinforcing region in which a thickness $T'n1$ of the partition wall is thicker than a basic partition wall thickness $T'n0$ in the cell structure including this partition wall in a range of a distance $L'n$ outside from each of the central boundary walls and a central inner boundary reinforcing region in which a thickness $T''m1$ of the partition wall is thicker than a basic partition wall thickness $T''m0$ in the cell structure including this partition wall in a range of a distance $L''m$ inside from each of the central boundary walls.

7. The honeycomb structure according to claim 6, wherein when on the surface orthogonal to the direction of extension of the cells of the honeycomb structure body, a distance $r0$ is defined as a distance from the centroid $O$ of the surface to an outside of the circumferential wall and a distance $r'n$ is defined as a distance from the centroid $O$ to each of the central boundary walls, the honeycomb structure body satisfies a relationship of a following Expression (5):

$$0.5 > (r0-L0)/(r0-r'n) > 0.1 \qquad (5).$$

8. The honeycomb structure according to claim 6, wherein the thickness $T'n1$ (mm) of the partition wall in the central outer boundary reinforcing region and the basic partition wall thickness $T'n0$ (mm) in the cell structure including this partition wall satisfy a relationship of a following Expression (6):

$$T'n0+0.0127 < T'n1 < T'n0+0.0381 \qquad (6).$$

9. The honeycomb structure according to claim 6, wherein the thickness T″m1 (*mm*) of the partition wall in the central inner boundary reinforcing region and the basic partition wall thickness T″m0 (*mm*) in the cell structure including this partition wall satisfy a relationship of a following Expression (7):

$$T''m0+0.0127<T''m1<T''m0+0.0381 \qquad (7).$$

10. The honeycomb structure according to claim 1, wherein an array direction of a repeat unit of the cells in the central cell structure is inclined not less than 10° and not more than 45° with respect to an array direction of a repeat unit of the cells in the circumferential cell structure.

\* \* \* \* \*